A. MONTGOMERY.
ELASTIC CORE FOR PACKING MATERIAL.
APPLICATION FILED JAN. 14, 1911.
989,177. Patented Apr. 11, 1911.
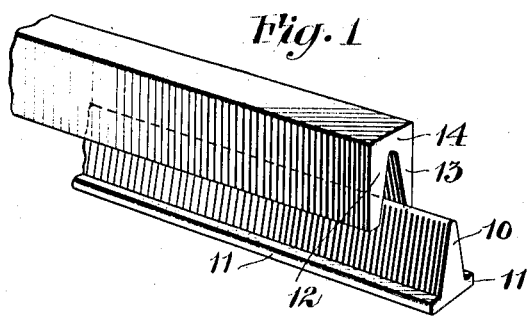
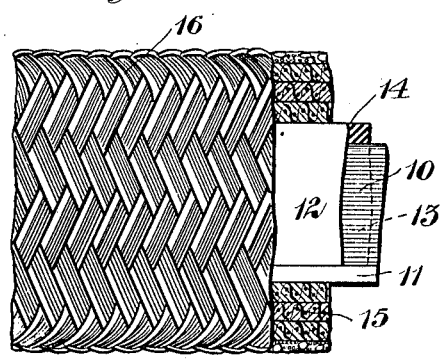
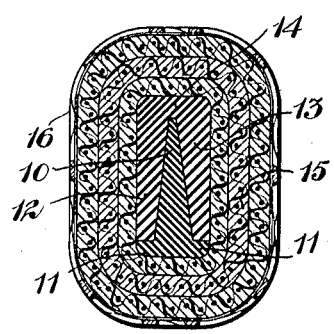
Witnesses:
Inventor:
Alexander Montgomery

UNITED STATES PATENT OFFICE.

ALEXANDER MONTGOMERY, OF NEWTON, MASSACHUSETTS, ASSIGNOR TO AMERICAN STEAM PACKING COMPANY, OF BOSTON, MASSACHUSETTS, A CORPORATION OF MAINE.

ELASTIC CORE FOR PACKING MATERIAL.

989,177.   Specification of Letters Patent.   Patented Apr. 11, 1911.

Application filed January 14, 1911. Serial No. 602,589.

*To all whom it may concern:*

Be it known that I, ALEXANDER MONTGOMERY, of Newton, in the county of Middlesex and State of Massachusetts, have invented certain new and useful Improvements in Elastic Cores for Packing Material, of which the following is a specification.

This invention relates to packing material, and its object is to provide an elastic core which will be more resilient than the core hitherto used in packing of this kind.

It may be stated that the particular kind of packing for which this core is especially adapted is intended for use under relatively high pressure. A form of packing adapted for high pressures is illustrated and described in Letters Patent of the United States 557,855, granted April 7, 1896. In that patent, and in the present application, the core of the packing is composed of elastic material, such as rubber.

A greater degree of elasticity is obtained as the result of this present invention by forming the core of coacting wedge-shaped members, which are arranged in the packing so as to have a wedging action when compressed.

The core in the present case may consist of two or more strips of wedge-shaped cross section, the strips being incased in fibrous material, such as cotton or asbestos, with or without an outer covering of tubular wire fabric.

Of the accompanying drawings which illustrate one form in which the invention may be embodied: Figure 1 represents a perspective view of portions of the core partly assembled. Fig. 2 represents a side elevation of a short section of packing material having a metallic tubular woven covering. Fig. 3 represents a cross section of packing material such as that shown by Fig. 2, inclosing a core composed of strips such as those shown by Fig. 1.

The same reference characters indicate the same parts wherever they occur.

The wedge-shaped strip indicated at 10 is hereinafter termed the central strip. Its broader edge is formed with laterally extending flanges 11, 11, one on either side. A wedge member 12 is arranged to lie against one wedge face of the strip 10, and a complemental wedge member 13 is arranged to lie against the opposite wedge face of the strip 10. The wedge members 12 and 13 may be connected with each other at 14, as shown by the drawings, but such connection is not essential, although it may facilitate the manufacture of the core, since the wedge members 12 and 13 may be formed from a single strip. Permanent connection of the wedge members 12 and 13 is desirable because it holds the wedge members in coöperative relation at all times and facilitates assembling a core comprising three wedge members only. The invention, however, is not limited to any number of wedge members, provided there are at least two wedge members. In the form illustrated, the inner faces of the wedge members 12 and 13 are inclined, but the outer faces are parallel. As a modification, the outer faces of the members 12 and 13 may also be inclined oppositely with relation to the inner faces in case it is desired to include additional wedge members to lie against the outer faces of the members 12 and 13.

When the wedge members are assembled, the narrow edges of the members 12 and 13 are seated upon the flanges 11, 11, as shown by Fig. 3. When the desired number of wedge members have been assembled in coöperative wedging relation, they are inclosed in a covering of fibrous material 15 which may be either wound around the core or may be woven as a tube or tubes. The fibrous material is preferably composed of cotton, asbestos, or analogous material, and is preferably impregnated with some suitable lubricant such as graphite, paraffin, or oil, or a compound thereof.

The tubular woven wire covering 16 is used to inclose the packing material when it is to be subjected to great pressure. The form and composition of the fibrous material and of the metallic covering form no part of the present invention and are illustrated and described merely to show the utility of the core. When the packing is arranged, for example, in a stuffing box so as to be compressed along its major diameter, the wedge-shaped members, acting upon each other, cause lateral expansion, both by reason of their elastic property and also by reason of their wedging action. It may be desirable to use a relatively hard compound of rubber for one of the strips and to use relatively soft resilient rubber for the other strip or strips, in which case a greater degree of expansion may be produced by making the central strip 10, in the present instance, of the harder material and the outer members 12 and 13 of softer material. The wedging action when the central strip is composed of harder material and the outer wedge members are composed of softer material would result in relatively great lateral expansion of the outer members and relatively little compression of the central member.

I claim:

A core for packing, comprising a plurality of members composed of resilient material, one of said members being arranged between two complemental outer members, the intermediate member having converging external faces and laterally extending flanges, one on either side, at the widely separated edges of said faces, said outer members having converging faces and being arranged in wedging relation with said intermediate member, the narrower edges of said outer members being arranged to be seated on said flanges.

In testimony whereof I have affixed my signature, in presence of two witnesses.

ALEXANDER MONTGOMERY.

Witnesses:
W. P. ABELL,
P. W. PEZZETTI.